UNITED STATES PATENT OFFICE.

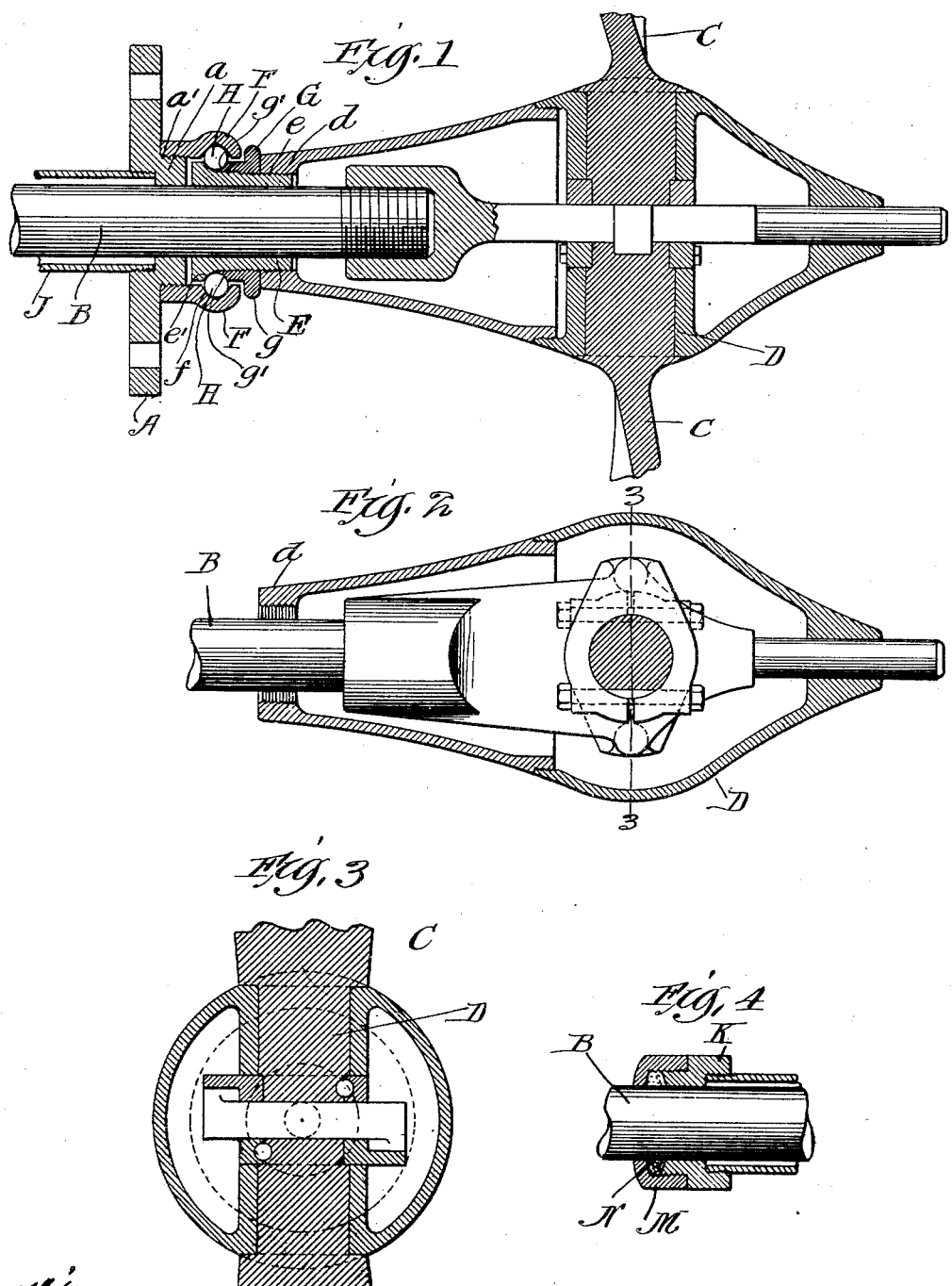

LEVI S. GARDNER, OF NEW ORLEANS, LOUISIANA.

BALL-BEARING FOR SCREW-PROPELLERS.

SPECIFICATION forming part of Letters Patent No. 675,474, dated June 4, 1901.

Application filed May 25, 1899. Serial No. 718,297. (No model.)

*To all whom it may concern:*

Be it known that I, LEVI S. GARDNER, a citizen of the United States, residing at New Orleans, parish of Orleans, State of Louisiana, have invented a certain new and useful Improvement in Ball-Bearings for Screw-Propellers; and I declare the following to be a full, clear, and exact description of the invention, such as will enable others skilled in the art to which it pertains to make and use the same, reference being had to the accompanying drawings, which form a part of this specification.

My invention has for its object the production of a ball-bearing for the shaft of a screw-propeller for use more particularly for relieving the friction of the bearing where the shaft leaves the stern-post of the boat.

It consists in a combination of devices and appliances hereinafter described and claimed.

In the drawings, Figure 1 is a longitudinal section of my structure. Fig. 2 is a longitudinal section at right angles to Fig. 1. Fig. 3 is a cross-section. Fig. 4 is a section of the stuffing-box.

In carrying out the invention, A represents the stern-post plate—that is, the plate attached to the stern-post through which the shaft passes and which carries the shaft-bearing. B is the shaft, C the propeller-blades, and D the support of casing for the blades, said blades being mounted so as to tilt in the casing, but to revolve with the shaft and casing. Surrounding the shaft B is a ring or fitting E, exteriorly threaded, as at $e$, to receive the end $d$ of the casing. Thus the shaft B has a longitudinal movement within the casing to set the blades at the desired angle; but both revolve together. The particular mechanism for tilting the blades by the longitudinal movement of the shaft is immaterial in this case, it being shown and described and claimed particularly in a concurrently-pending application.

Projecting from the stern-post plate A is a ring $a$, exteriorly threaded, as at $a'$, to receive the ring F. In the latter is an interior groove $f$. On the ring or fitting E is a bearing-face $e'$, and engaged to said ring by the threads $e$ is a ring G, having a flange or extension $g$, and the end $g'$ of said flange constitutes also a bearing. Thus the two walls of the groove $f$, the bearing $e'$, and the bearing $g'$ constitute a runway or race for the balls H. By adjusting the ring G the race is adjusted to the balls.

Extending from the stern-post to the interior of the boat and surrounding the shaft B is a tube J. This tube may extend to any desirable point and on its end be provided with a stuffing-box made up of the ring K, surrounding the shaft B, interiorly threaded to receive the end of the tube J and exteriorly threaded to receive the stuffing cap or nut M, the stuffing N being any suitable substance for that purpose.

By the above construction it will be seen that I have provided a ball-bearing which performs two functions: First, it relieves the friction incident to the weight of the shaft when the latter is revolving—that is, it relieves the vertical strain; second, when the blades are reversed while the shaft is revolving the balls take the end thrust due to the longitudinal movement of the shaft in causing the blades to reverse, thus relieving the friction at that time.

It will be observed that in the above construction the water surrounds and lubricates the ball-bearing and extends in the tube up to the stuffing-box. To prevent the balls and bearing from rusting, I make them of a composition of metal which while non-corrosive is very hard.

What I claim is—

1. In a reversible blade-propeller mechanism, the combination of a stationary part, a shaft passing therethrough, a support for the blades with relation to which the shaft is longitudinally movable, and an antifriction device interposed between the support and the stationary part, substantially as described.

2. In a reversible blade-propeller mechanism, the combination of a stationary part, a shaft passing therethrough, a supporting-casing for the propeller-blades, rotatable with said shaft and held from longitudinal movement, and an antifriction device interposed between said stationary part and the casing, substantially as described.

3. In a reversible blade-propeller mechanism, the combination of a stationary part, the shaft passing therethrough, a hollow casing for supporting the blades, said casing being held from longitudinal movement and an antifriction device interposed between the stationary part and the hollow casing, substantially as described.

4. In a propeller mechanism, the combination with a stationary part, of a shaft passing therethrough, a ring E surrounding said shaft, an antifriction device between said ring and said stationary part, and a support for the blades secured to said ring E, substantially as described.

In testimony whereof I sign this specification in the presence of two witnesses.

LEVI S. GARDNER.

Witnesses:
 LOUIS GRÜNEWALD,
 J. C. WENCK.